A. E. BARTHEL.
Taps and Dies.
No. 139,651. Patented June 10, 1873.
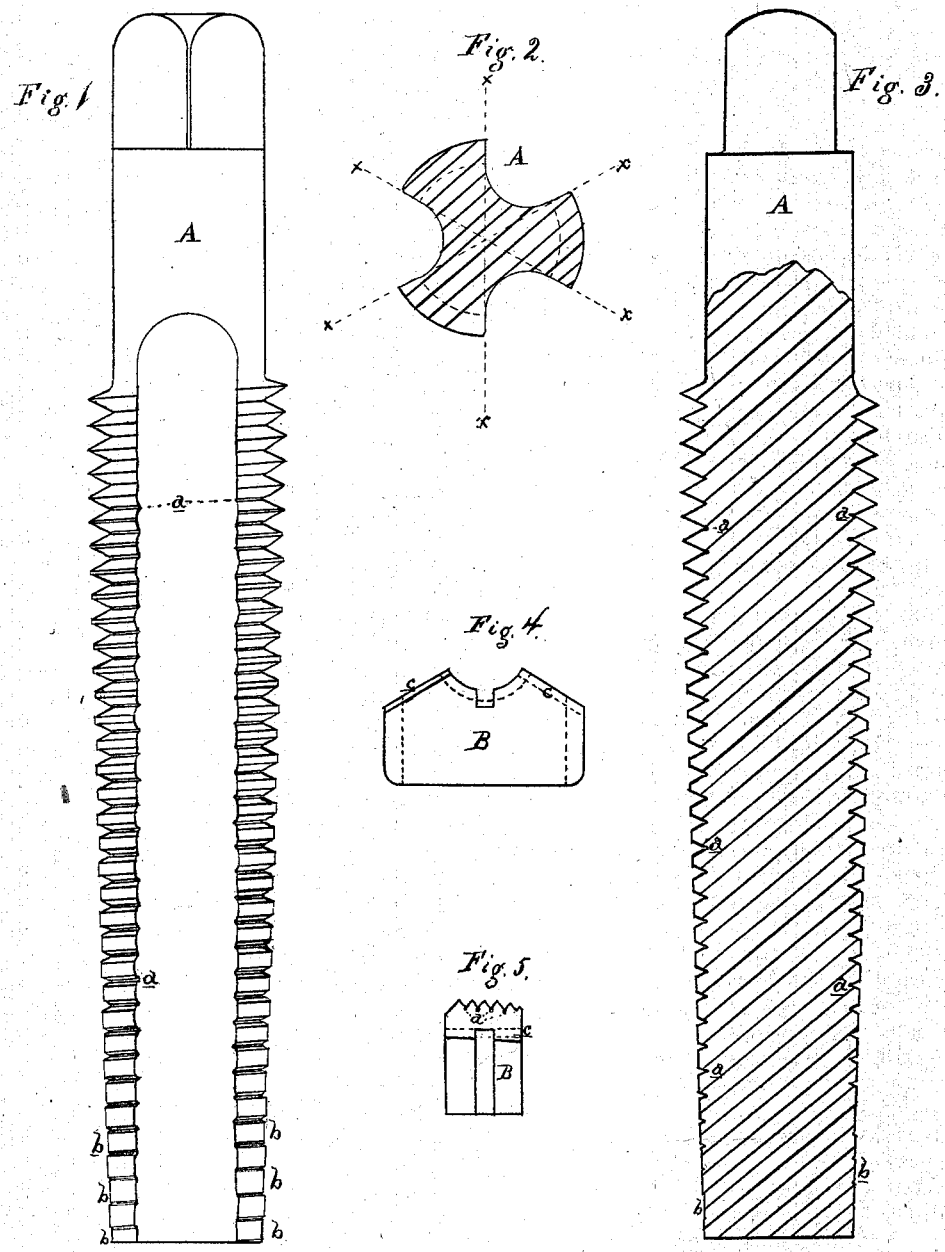
ATTEST:
H. F. Eberts
A. J. Sprague
INVENTOR:
A. Edward Barthel
per attorney
Ths. S. Sprague

UNITED STATES PATENT OFFICE.

ALBRECHT E. BARTHEL, OF DETROIT, MICHIGAN, ASSIGNOR TO HIMSELF AND ALEXANDER B. BARY, OF SAME PLACE.

IMPROVEMENT IN TAPS AND DIES.

Specification forming part of Letters Patent No. 139,651, dated June 10, 1873; application filed February 18, 1873.

*To all whom it may concern:*

Be it known that I, ALBRECHT EDWARD BARTHEL, of Detroit, in the county of Wayne and State of Michigan, have invented a new and useful Improvement in Taps and Dies; and I do declare that the following is a true and accurate description thereof, reference being had to the accompanying drawings and to the letters of reference marked thereon, and being a part of this specification, in which—

Figure 1 is an elevation of a fluted tap with my improvement. Fig. 2 is a cross-section of the same. Fig. 3 is a longitudinal section on any line $x$ in Fig. 2. Fig. 4 is a plan view of one of my improved dies; and Fig. 5 is an end elevation of the same.

Like letters refer to like parts in the several figures.

The nature of this invention relates to an improvement in the construction of screw-cutting taps and dies whereby the friction is so much reduced that in tapping a nut or threading a bolt no oil or other lubricant, or water or other cooling liquid, is necessary, while the operation requires a less expenditure of power than heretofore. The invention consists in turning a shallow groove in the bottom of all the threads in the tap, except at the head, for a distance equal to the thickness of the nut to be tapped, and in reducing for an equal distance from the point the projection of every second segment; also, in embodying the same modification of the grooved-thread bases in the dies, the tap and die operating as more fully hereinafter set forth.

In the drawing, A represents an ordinary fluted and tapered screw-tap, whose spiral segmental cutters are formed in the usual manner, after which, whether in the taps as sold in the market, or in the process of manufacture, I center the tap in a screw-cutting lathe and adjust the change-wheels to the lead-screw so as to give the slide-rest a longitudinal feed corresponding with the pitch of the screw of the tap, adjusting a tool in the rest which will enable me to cut a narrow and shallow groove, $a$, in the base of each thread, except at the head and point of the tap, for a distance equal to the thickness of the nut, leaving the bases of the tap-threads at those points the full diameter (inside) of the nut to be tapped. When this tap is run through a nut the first cutters form the threads, and each successive cutter deepens the thread, the channels or grooves $a$ leaving the point or outer diameter intact until the threads are nearly completed, when the upper cutter-segments of the tap finish the points of the threads and clean out their bases. In the taps heretofore constructed the entire surface of the threads in the nut were subjected to the action of the cutters, which would compress and abrade them, grinding and cutting them gradually down to the required form, necessarily requiring the expenditure of a great deal of power to overcome the resultant friction, while in this each cutter-segment successively takes a chip or shaving like a lathe-tool, which effects a great reduction in the power required to tap the thread in the nut. To still further reduce the friction, I reduce the diameter of every second cutter at the point, alternating in the flutes, as seen at $b$, Figs. 1 and 2. By means of these improvements I am enabled to produce a nut with a sharp and well-finished thread with so little friction that no lubricant whatever is required to overcome it.

B is one of a pair of dies having the channel or groove $a$ turned in the base of its thread for the same reason given for cutting it in the tap. The dies I grind off to an angle of ninety degrees, or thereabout, from the ends of the die-threads or cutting-segments, sloping backward, as at $c$, Figs. 4 and 5. These edges or slopes are beveled in opposite directions to each other, as shown by the black and dotted lines in Fig. 4.

The effect of this beveling of the meeting-faces is that the chips or shavings taken from the bolt will have an easy clearance from the dies, and also causes each cutting segment to act successively upon the advancing rod or bolt.

The ordinary square dies may be readily altered to the form shown, but should preferably be so made in the process of manufacture.

What I claim as my invention, and desire to secure by Letters Patent, is—

1. A tap having the grooves $a$ cut or turned in the bases of its threads, substantially as herein described and shown, and for the purpose set forth.

2. A tap having the alternating cutting-segments b near its points reduced in diameter, substantially as and for the purposes herein shown and specified.

3. A screw-cutting die having a groove, a, cut in the bases of its threads, substantially as and for the purpose set forth.

ALBRECHT EDWARD BARTHEL.

Witnesses:
H. F. EBERTS,
H. S. SPRAGUE.